June 27, 1944.                L. G. HATCH                2,352,320
                              GARDEN TOOL
                          Filed April 29, 1943
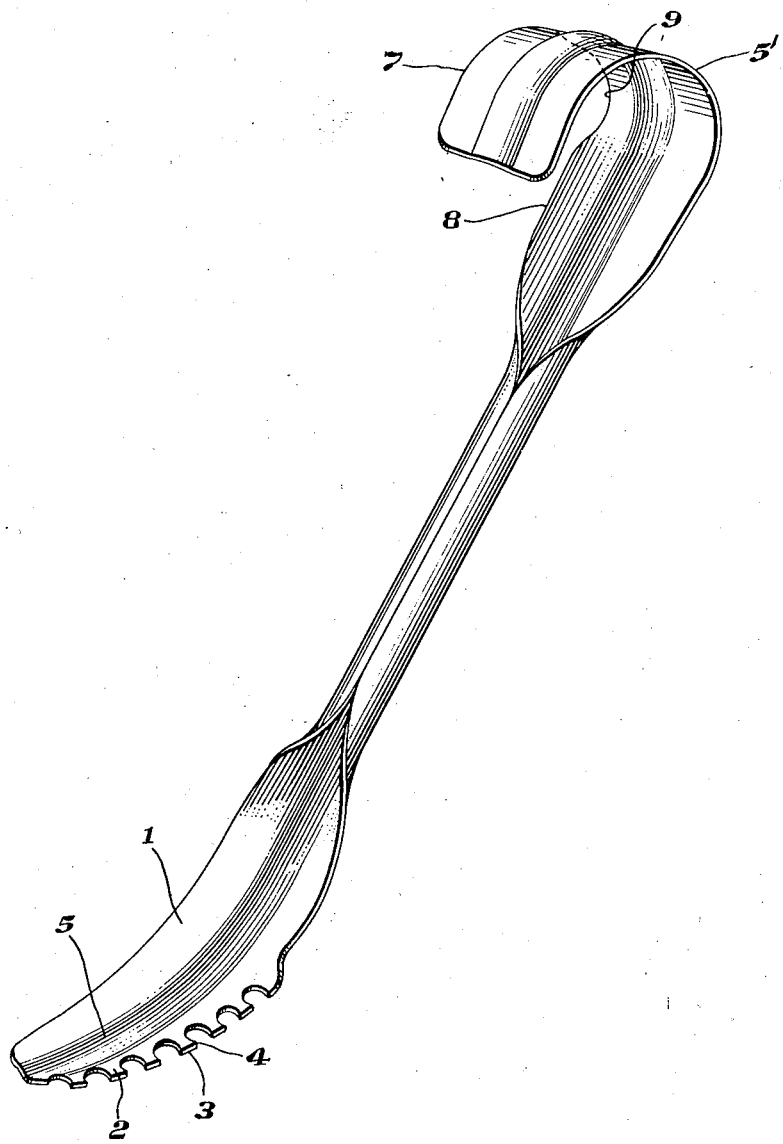
Leo George Hatch
                INVENTOR
BY
                ATTORNEY Patented June 27, 1944

2,352,320

UNITED STATES PATENT OFFICE 2,352,320

GARDEN TOOL

Leo George Hatch, Concord, N. H.

Application April 29, 1943, Serial No. 484,983

2 Claims. (Cl. 294—50.6)

This invention has for its object to provide a novel and improved garden tool.

The drawing is a perspective view of the novel garden tool of the invention.

This tool, preferably formed from sheet metal for lightness, comprises at one end a blade 1 substantially longer than it is wide, curved lengthwise, and with gradually converging side edges. One edge is provided with a plurality of teeth 2, these teeth preferably having blunt or non-pointed ends 3 and with the side edges terminating in little hooks 4, substantially as shown.

This novel tool has numerous utilities and advantages.

It serves as a very effective weed digger and puller. By inserting the blade, point down in the ground beside the weed, the end will readily travel under the weed and into or below the roots, and with a slight twist of the blade the weed stem or roots will be meshed between the teeth and engaged by hooks 4 and the weed will be easily and quickly pulled out, all with a quick stroke and turn of the wrist.

The blade also is most useful for digging holes. Also, in small sizes, which I find appropriate for this tool, it is most practical for cleaning out around shrubs and rosebushes and the like. And in such uses, the teeth can be readily used also for raking or for cutting bleeders.

The blade may have a shallow rib 5 lengthwise for strengthening purposes, as shown.

Any form of handle may be used, but I find it desirable to form the device of one piece of sheet metal as shown, with the metal at the other end terminating in a flat ribbon, rounded at the end to form a hook 5', which is convenient for digging furrows and the like. By pulling this hooked end through the soil, with the lower edge 7 at the end of the hook in a plane slightly above the plane of the opposite lower edge portion 8, the dirt will all be thrown to one side. By cutting away the lower edge, as at 9, the desired angle is readily determined in use.

The handle portion may be of a size to be readily grasped by the hand, and this tool may be shaped from a single piece of sheet metal and all light garden work may be done with this single, inexpensive, light tool.

I claim:

1. A garden tool having a tapered blade substantially longer than wide and curved transversely and longitudinally, one side edge being provided with a plurality of blunt teeth, the side edges of which have hook shaped outer ends.

2. A garden tool having a tapered blade substantially longer than wide, one side edge being provided with a plurality of blunt teeth, the side edges of which have hook shaped outer ends.

LEO GEORGE HATCH.